(12) United States Patent
Hefty et al.

(10) Patent No.: US 8,099,471 B2
(45) Date of Patent: Jan. 17, 2012

(54) METHOD AND SYSTEM FOR COMMUNICATING BETWEEN MEMORY REGIONS

(75) Inventors: Mark Sean Hefty, Aloha, OR (US); Jerrie L. Coffman, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 69 days.

(21) Appl. No.: 12/542,546

(22) Filed: Aug. 17, 2009

(65) Prior Publication Data

US 2010/0146069 A1    Jun. 10, 2010

Related U.S. Application Data

(63) Continuation of application No. 09/576,038, filed on May 23, 2000, now Pat. No. 7,624,156.

(51) Int. Cl.
*G06F 15/167* (2006.01)

(52) U.S. Cl. ......... 709/212; 709/224; 709/220; 370/232

(58) Field of Classification Search ............... 709/220, 709/212, 224; 370/232
See application file for complete search history.

(56) References Cited

U.S. PATENT DOCUMENTS

| | | |
|---|---|---|
| 4,489,378 A | 12/1984 | Dixon et al. |
| 4,860,193 A | 8/1989 | Bentley et al. |
| 5,038,277 A | 8/1991 | Altman et al. |
| 5,208,810 A | 5/1993 | Park |
| 5,271,009 A | 12/1993 | Takano et al. |
| 5,475,433 A | 12/1995 | Jeong |
| 5,550,957 A | 8/1996 | Davidson, Jr. et al. |
| 5,633,870 A | 5/1997 | Gaytan et al. |
| 5,771,354 A * | 6/1998 | Crawford .................. 709/229 |
| 5,771,356 A * | 6/1998 | Leger et al. .................. 709/233 |
| 5,777,624 A | 7/1998 | Munson |
| 5,937,436 A | 8/1999 | Watkins |
| 6,055,589 A | 4/2000 | Kawamura et al. |
| 6,112,263 A | 8/2000 | Futral |
| 6,125,433 A | 9/2000 | Horstmann et al. |
| 6,148,366 A | 11/2000 | Watanabe |
| 6,170,025 B1 * | 1/2001 | Drottar et al. ................ 710/48 |
| 6,185,607 B1 | 2/2001 | Lo et al. |
| 6,243,778 B1 | 6/2001 | Fung et al. |
| 6,260,129 B1 | 7/2001 | Crockett et al. |
| 6,279,140 B1 | 8/2001 | Slane |
| 6,324,178 B1 | 11/2001 | Lo et al. |
| 6,423,778 B1 | 7/2002 | McGee et al. |
| 6,600,721 B2 * | 7/2003 | Edholm ..................... 370/232 |
| 6,615,282 B1 | 9/2003 | Futral |

(Continued)

OTHER PUBLICATIONS

Non-Final Office Action for U.S. Appl. No. 09/409,253, mailed on May 22, 2002.

(Continued)

*Primary Examiner* — Tammy Nguyen
(74) *Attorney, Agent, or Firm* — Christopher K. Gagne

(57) ABSTRACT

A method and system are provided for transferring data in a networked system between a local memory in a local system and a remote memory in a remote system. A RDMA request is received and a first buffer region is associated with a first transfer operation. The system determines whether a size of the first buffer region exceeds a maximum transfer size of the networked system. Portions of the second buffer region may be associated with the first transfer operation based on the determination of the size of the first buffer region. The system subsequently performs the first transfer operation.

15 Claims, 9 Drawing Sheets

U.S. PATENT DOCUMENTS

| | | | | |
|---|---|---|---|---|
| 6,658,469 | B1 * | 12/2003 | Massa et al. | 709/224 |
| 6,721,271 | B1 * | 4/2004 | Beshai et al. | 370/232 |
| 6,724,896 | B1 * | 4/2004 | Beckett et al. | 380/255 |
| 6,993,599 | B2 | 1/2006 | Simpson, III | |
| 7,624,156 | B1 | 11/2009 | Hefty et al. | |
| 2005/0152274 | A1 | 7/2005 | Simpson, III | |

OTHER PUBLICATIONS

Non-Final Office Action for U.S. Appl. No. 11/050,143, mailed on Jan. 17, 2008, 46 pages.
Response to Non-Final Office Action for U.S. Appl. No. 11/050,143, filed May 19, 2008, 20 pages.
Final Office Action for U.S. Appl. No. 11/050,143, mailed on Jul. 21, 2008, 24 pages.
Response to Final Office Action for U.S. Appl. No. 11/050,143, filed Sep. 22, 2008, 19 pages.
Definition for: Packet, Computer High-tech Dictionary, 2009, Webpage available at:—http://www.computeruser.com/resources/dictionary/noframes/index.html.
Brenner, Alan F., "Fibre Channel-Gigabit Communications and I/O for Computer Networks", McGraw-Hill, 1996, Chapters 6, 7, 8, 12 and 17, 112 pages.
Response to Non-Final Office Action for U.S. Appl. No. 09/409,253, filed Aug. 22, 2002.
Non-Final Office Action for U.S. Appl. No. 10/345,817, mailed on Sep. 8, 2003, 10 pages.
Response to Non-Final Office Action for U.S. Appl. No. 10/345,817, filed Jan. 29, 2004, 17 pages.
Final Office Action for U.S. Appl. No. 10/345,817, mailed on Apr. 22, 2004, 7 pages.
Response to Final Office Action for U.S. Appl. No. 10/345,817, filed Jun. 1, 2004, 9 pages.
Response to Non-Final Office Action for U.S. Appl. No. 09/576,038, filed Aug. 16, 2004.
Final Office Action for U.S. Appl. No. 09/576,038, mailed on Jan. 3, 2005, 10 pages.
Response to Final Office Action for U.S. Appl. No. 09/576,038, filed Apr. 25, 2005.
Non-Final Office Action for U.S. Appl. No. 09/576,038, mailed on Aug. 2, 2005, 10 pages.
Response to Non-Final Office Action for U.S. Appl. No. 09/576,038, filed Dec. 2, 2005, 16 pages.
Non-Final Office Action for U.S. Appl. No. 09/576,038, mailed on Feb. 23, 2006, 9 pages.
Response to Non-Final Office Action for U.S. Appl. No. 09/576,038, filed May 19, 2006, 14 pages.
Final Office Action for U.S. Appl. No. 09/576,038, mailed on Aug. 22, 2006.
Response to Final Office Action for U.S. Appl. No. 09/576,038, filed Nov. 22, 2006, 16 pages.
Non-Final Office Action for U.S. Appl. No. 09/576,038, mailed on Jan. 26, 2007, 12 pages.
Response to Non-Final Office Action for U.S. Appl. No. 09/576,038, filed May 29, 2007, 11 pages.
Final Office Action for U.S. Appl. No. 09/576,038, mailed on Aug. 6, 2007, 15 pages.
Non-Final Office Action for U.S. Appl. No. 09/576,038, mailed on Jan. 9, 2008, 17 pages.
Response to Non-Final Office Action for U.S. Appl. No. 09/576,038, filed May 9, 2008, 20 pages.
Non-Final Office Action for U.S. Appl. No. 09/576,038, mailed on Aug. 20, 2008, 18 pages.
Response to Non-Final Office Action for U.S. Appl. No. 09/576,038, filed Apr. 23, 2009, 9 pages.
Notice of Allowance for U.S. Appl. No. 09/576,038, mailed on Jun. 19, 2009, 34 pages.
Amendment after Notice of Allowance for U.S. Appl. No. 09/576,038, mailed on Aug. 12, 2009, 10 pages.
Sapuntzakis, C., et al. "TCP RDMA Option:draft-csapuntz-tcprdma-00.txt," Internet Draft, Feb. 2000, pp. 1-19.

* cited by examiner

METHOD AND SYSTEM FOR COMMUNICATING BETWEEN MEMORY REGIONS

CROSS-REFERENCE TO RELATED APPLICATIONS

This application is a continuation of prior co-pending U.S. patent application Ser. No. 09/576,038 filed May 23, 2000.

FIELD

The present invention generally relates to data networks and in particular relates to a method and system for performing memory to memory transfers between two systems.

BACKGROUND

A data network is generally consisted of a network of nodes connected by point-to-point links. Each physical link may support a number of logical point-to-point channels. Each channel may be a bi-directional communication path for allowing commands and message data to flow between two connected nodes within the data network. Each channel may refer to a single point-to-point connection where message data may be transferred between two endpoints or systems. Data may be transmitted in packets including groups called cells from source to destination often through intermediate nodes.

In many data networks, hardware and software may often be used to support asynchronous data transfers between two memory regions, often on different systems. Each system may correspond to a multi-processor system including one or more processors. Each system may serve as a source (initiator) system which initiates a message data transfer (message send operation) or a target system of a message passing operation (message receive operation). Examples of such a multi-processor system may include host servers providing a variety of applications or services, and I/O units providing storage oriented and network oriented I/O services.

Next Generation I/O (NGIO) architecture, virtual interface (VI) architecture and Infiniband architecture provide an I/O communication mechanism among different computer systems. Communication allows movement of data between two memory regions, typically on different systems. Because hardware limitations exist with NGIO, VI and Infiniband architectures, a remote direct memory access (RDMA) operation may create a request larger than that supported by the underlying hardware and software. More specifically, the RDMA request can transfer data from multiple local memory buffers into a single remote memory region; however, the network hardware or software may impose limitations on the size of a single data transfer. This may slow down the data transfer or result in an incorrect data transfer. For example, many NGIO architectures can only support a 4 gigabyte data transfer due to hardware limitations. However, it may be desirable to transfer more than 4 gigabytes of data efficiently.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and is not limited thereto. The spirit and scope of the present invention being limited only by the terms of the appended claims.

The following represents brief descriptions of the drawings in which like numerals relate to like elements and wherein.

DETAILED DESCRIPTION

Figure 1:
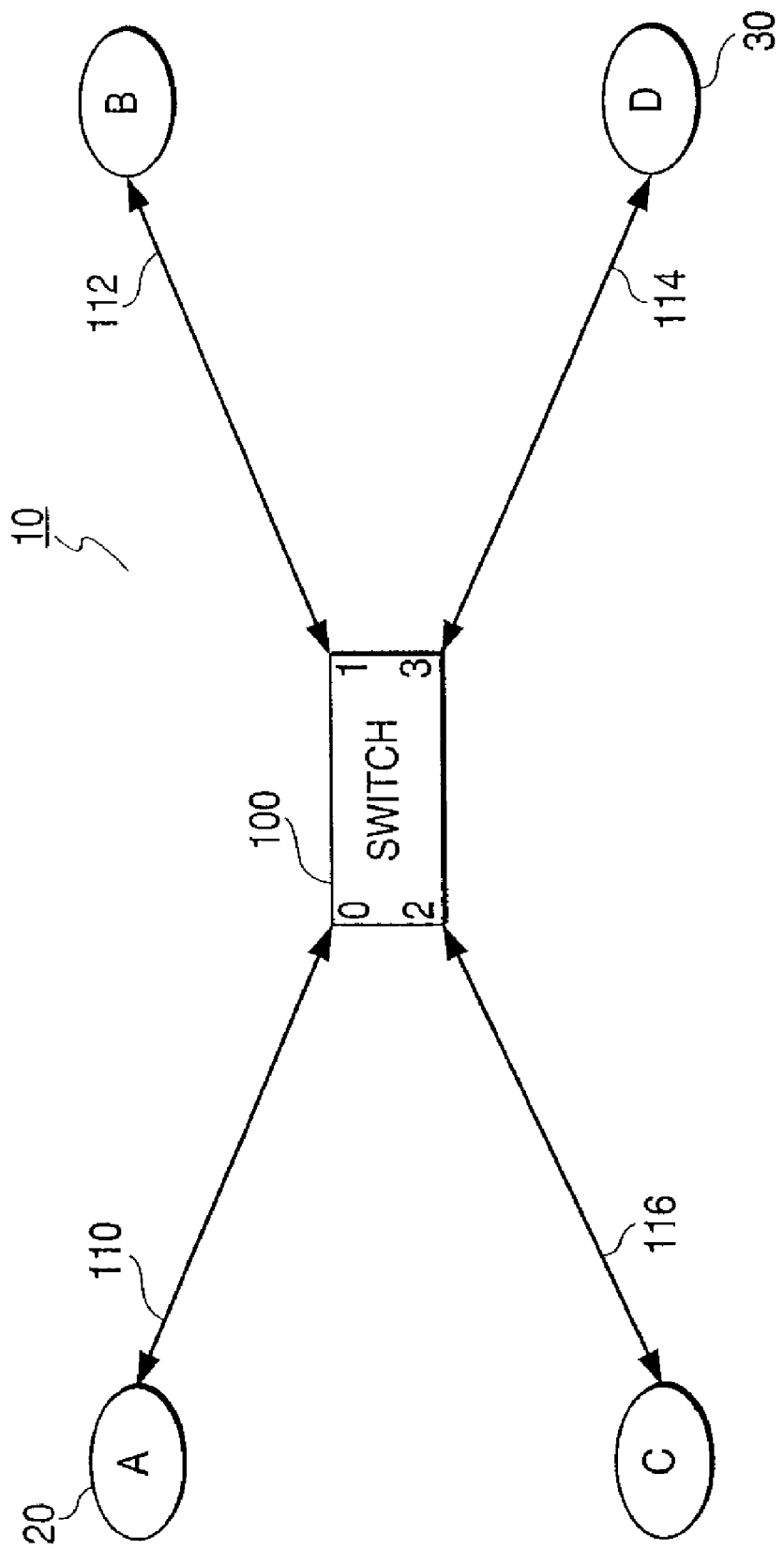
FIG. 1 is a diagram illustrating an example data network having several nodes interconnected by corresponding links of a basic switch according to an example embodiment of the present invention.

Before beginning a detailed description of the present invention, mention of the following is in order. When appropriate, like reference numerals and characters may be used to designate identical, corresponding or similar components in differing figure drawings. Furthermore, in the detailed description to follow, example sizes/models/values/ranges may be given, although the present invention is not limited to the same. Whereas specific details are set forth in order to describe example embodiments of the invention, it should be apparent to one skilled in the art that the invention can be practiced without these specific details. It should also be apparent that any combination of hardware and software instructions can be used to implement the embodiments of the present invention, i.e., the present invention is not limited to any specific combination of hardware and software instructions.

The present invention may relate to NGIO, VI and/or Infiniband architectures that allow movement of data from multiple, local memory locations to a single remote memory region. Other examples of computer networks that may include the present invention are a local area network (LAN), a wide area network (WAN), a campus area network (CAN), a metropolitan area network (MAN), a global area network (GAN) and a system area network (SAN). However, for the sake of simplicity, discussions will concentrate mainly on data movement in a simple data network having example nodes (e.g., computers, servers and I/O units) interconnected by corresponding links and switches, although the scope of the present invention is not limited thereto.

The present invention may provide a method and system by which multiple RDMA requests to a single, remote memory buffer can be merged (or coalesced) together into one operation to thereby provide a better performance system through optimal resource utilization. However, single or coalesced RDMA operations may create a RDMA request larger than the underlying hardware and/or software can support. These requests may be divided into smaller, individual blocks. This facilitates rapid driver development to support RDMA transfer requests larger than that provided by the underlying hardware and/or software. This also ensures that coalesced operations can be as efficient as possible.

Attention now is directed to the drawings and particularly to FIG. 1, in which a simple data network 10 having several interconnected nodes for data communications according to an embodiment of the present invention is illustrated. As shown in FIG. 1, the data network 10 may include, for example, one or more centralized switches 100 and four different nodes A, B, C, and D.

The remainder of this disclosure will discuss a local computer system and a remote computer system. For the sake of example, a local computer system 20 may be provided at node A and a remote computer system 30 may be provided at node D. The terminology local and remote is used hereinafter to describe two systems that are physically separated from each other. The terminology local and remote does not imply any differences between the systems other than they are physically separated from each other.

Each of the local system 20 and the remote system 30 may include one or more input/output units (I/O units) and one or more I/O controllers. Each I/O controller may operate to control one or more I/O devices, such as storage devices (e.g., a hard disk drive or tape drive) locally or remotely via a local area network (LAN) or a wide area network (WAN), for example.

The centralized switch 100 may contain, for example, switch ports 0, 1, 2, and 3 each connected to a corresponding node of the four different nodes A, B, C, and D via a corresponding physical link 110, 112, 114, and 116. Each physical link may support a number of logical point-to-point channels. Each channel may be a bi-directional communication path for allowing commands and data to flow between two connect nodes (e.g., host systems, switch/switch elements, and I/O units) within the network.

Each channel may refer to a single point-to-point connection where data may be transferred between endpoints (e.g., host systems and I/O units). The centralized switch 100 may also contain routing information using, for example, explicit routing and/or destination address routing for routing data from a source node (data transmitter) to a target node (data receiver) via corresponding link(s), and re-routing information for redundancy.

The specific number and configuration of end stations (e.g., host systems and I/O units), switches and links shown in FIG. 1 are provided simply as an example data network. A wide variety of implementations and arrangements of a number of end stations (e.g., host systems and I/O units), switches and links in all types of data networks may be possible.

According to an example embodiment or implementation, the end stations (e.g., host systems and I/O units) of the example data network shown in FIG. 1 may be compatible with the "*Next Generation Input/Output (NGIO) Specification*" as set forth by the NGIO Forum on Mar. 26, 1999. According to the NGIO Specification, the switch 100 may be an NGIO switched fabric (e.g., collection of links, switches and/or switch elements connecting a number of host systems and I/O units), and the endpoint may be a host system including one or more host channel adapters (HCAs), or a target system such as an I/O unit including one or more target channel adapters (TCAs). Both the host channel adapter (HCA) and the target channel adapter (TCA) may be broadly considered as fabric adapters provided to interface endpoints to the NGIO switched fabric, and may be implemented in compliance with "*Next Generation I/O Link Architecture Specification: HCA Specification, Revision* 1.0" as set forth by NGIO Forum on Jul. 20, 1999 for enabling the endpoints (nodes) to communicate to each other over an NGIO channel (s).

Figure 2:
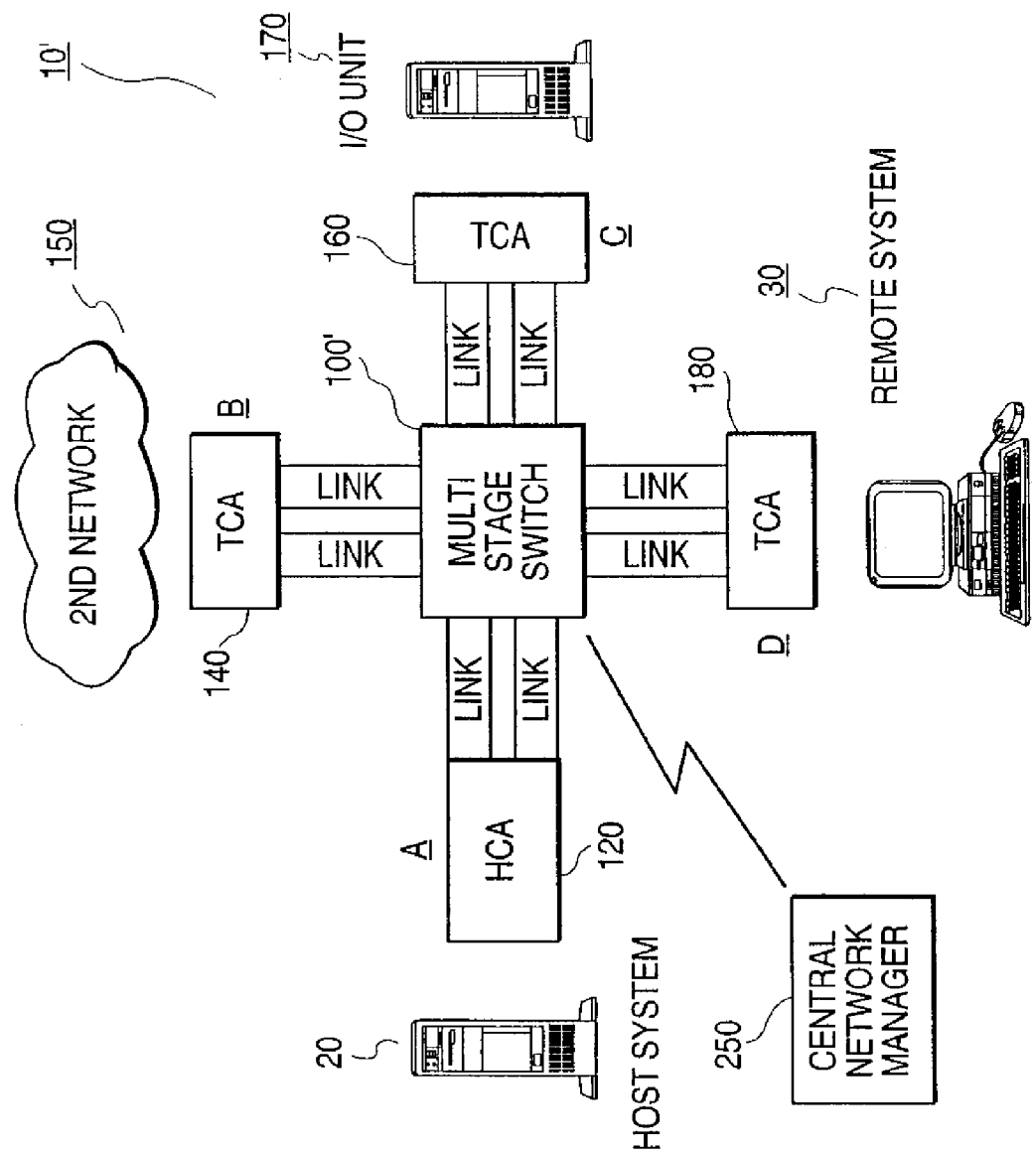
FIG. 2 illustrates another example data network having several nodes interconnected by corresponding links of a multi-stage switched fabric according to an example embodiment of the present invention.

For example, FIG. 2 illustrates an example data network 10' using a NGIO architecture to transfer data from a source node to a destination node according to an embodiment of the present invention. As shown in FIG. 2, the data network 10' includes an NGIO fabric 100' (multi-stage switched fabric comprised of a plurality of switches) for allowing a host system and a remote system to communicate to a large number of other host systems and remote systems over one or more designated channels. A single channel may be sufficient but data transfer speed between adjacent ports can decrease latency and increase bandwidth. Therefore, separate channels for separate control flow and data flow may be desired. For example, one channel may be created for sending request and reply messages. A separate channel or set of channels may be created for moving data between the host system and any one of the target systems. In addition, any number of end stations, switches and links may be used for relaying data in groups of cells between the end stations and switches via corresponding NGIO links.

For example, node A may represent the host or local system 20 such as a host computer or a host server on which a variety of applications or services are provided. Similarly, node B may represent another network 150, including, but are not limited to, local area network (LAN), wide area network (WAN), Ethernet, ATM and fibre channel network, that is connected via high speed serial links. Node C may represent an I/O unit 170, including one or more I/O controllers and I/O units connected thereto. Likewise, node D may represent the remote system 30 such as a target computer or a target server on which a variety of applications or services are provided. Alternatively, nodes A, B, C, and D may also represent individual switches of the multi-stage switched fabric 100' which serve as intermediate nodes between the host system 20 and the remote systems 150, 170 and 30.

The multi-state switched fabric 100' may include a central network manager 250 connected to all the switches for managing all network management functions. However, the central network manager 250 may alternatively be incorporated as part of either the host system 20, the second network 150, the I/O unit 170, or the remote system 30 for managing all network management functions. In either situation, the central network manager 250 may be configured for learning network topology, determining the switch table or forwarding database, detecting and managing faults or link failures in the network and performing other network management functions.

A host channel adapter (HCA) 120 may be used to provide an interface between a memory controller (not shown) of the local system 20 and a multi-stage switched fabric 100' via high speed serial NGIO links. Similarly, target channel adapters (TCA) 140 and 160 may be used to provide an interface between the multi-stage switched fabric 100' and an I/O controller of either a second network 150 or an I/O unit 170 via high speed serial NGIO links. Separately, another target channel adapter (TCA) 180 may be used to provide an interface between a memory controller (not shown) of the remote system 30 and the multi-stage switched fabric 100' via high speed serial NGIO links. Both the host channel adapter (HCA) and the target channel adapter (TCA) may be broadly considered as fabric hardware adapters provided to interface either the local system 20 or any one of the target systems 150, 170 and 30 to the switched fabric, and may be implemented in compliance with "*Next Generation I/O Link Architecture Specification: HCA Specification, Revision 1.0*" as set forth by NGIO Forum on Jul. 20, 1999 for enabling the endpoints (nodes) to communicate to each other over an NGIO channel (s). However, NGIO is merely one example embodiment or implementation of the present invention, and the invention is not limited thereto. Rather, the present invention may be applicable to a wide variety of any number of data networks, hosts and I/O units. The present invention is also applicable to VI and Infiniband architectures.

Figure 3:
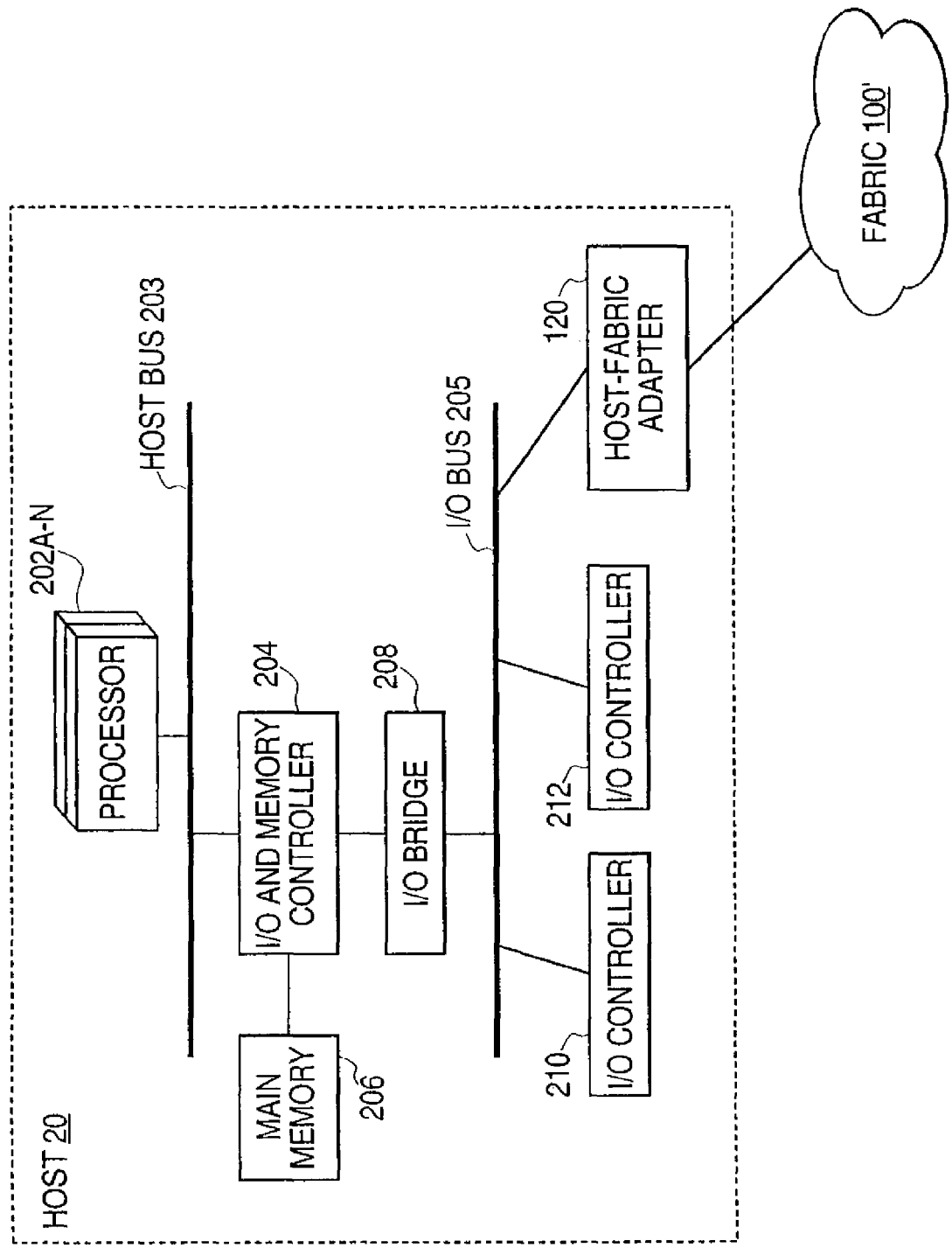
FIG. 3 illustrates a block diagram of a host system of a data network according to an example embodiment of the present invention.

One example embodiment of a host or local system 20 is shown in FIG. 3. Referring to FIG. 3, the host or local system 20 may correspond to a multi-processor system, including one or more processors 202A-202N coupled to a host bus 203. Each of the multiple processors 202A-202N may operate on a single item (I/O operation), and all of the multiple processors 202A-202N may operate on multiple items (I/O operations) on a list at the same time. An I/O and memory controller 204 (or chipset) may be connected to the host bus 203. A main memory 206 may be connected to the I/O and memory controller 204. An I/O bridge 208 may operate to bridge or interface between the I/O and memory controller 204 and an I/O bus 205. Several I/O controllers may be attached to the I/O bus 205, including an I/O controllers 210 and 212. I/O controllers 210 and 212 (including any I/O devices connected thereto) may provide bus-based I/O resources.

Figure 4:
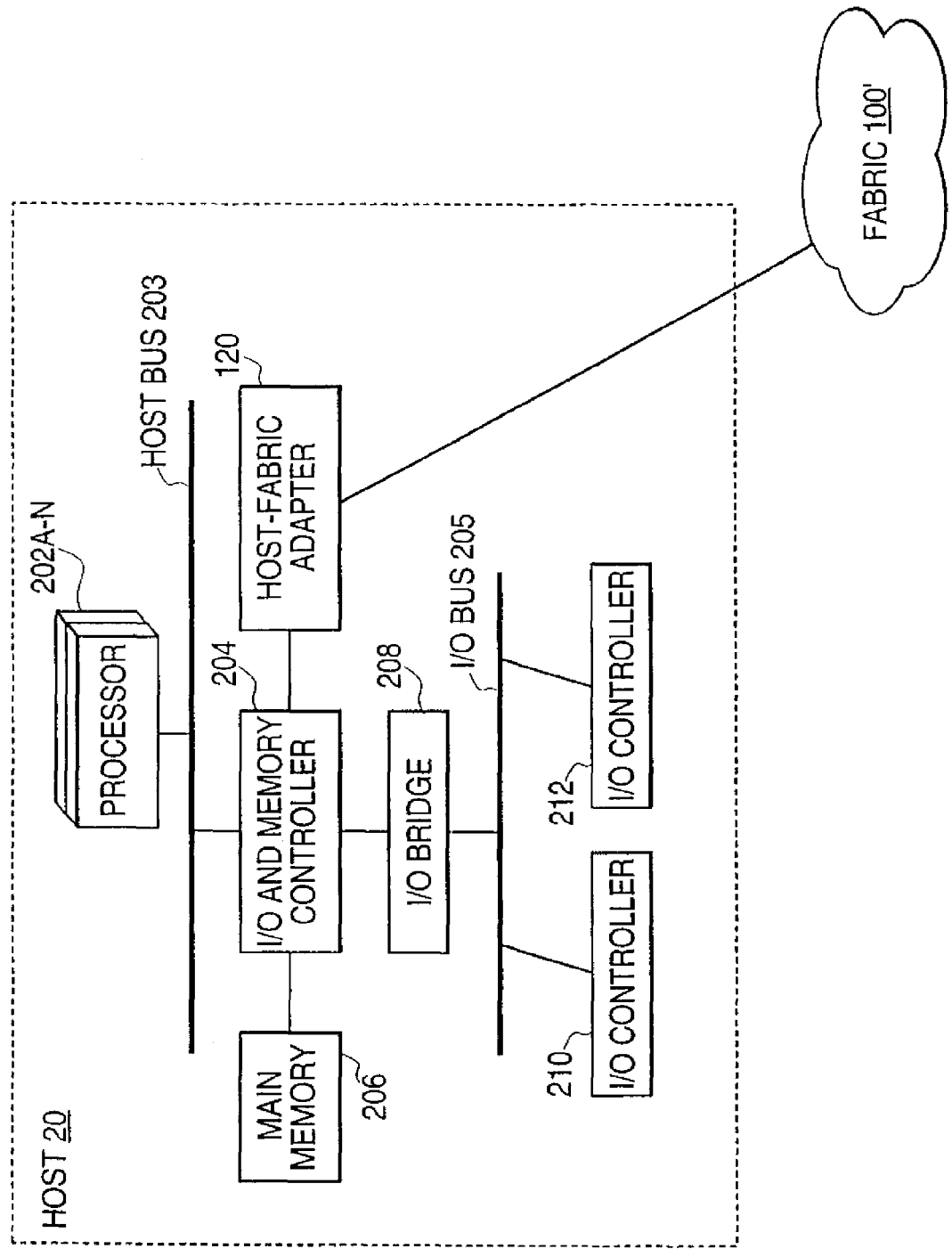
FIG. 4 illustrates a block diagram of a host system of a data network according to another example embodiment of the present invention.

One or more host-fabric adapters 120 may also be connected to the I/O bus 205. Alternatively, one or more host-fabric adapters 120 may be connected directly to the I/O and memory controller (or chipset) 204 to avoid the inherent limitations of the I/O bus 205 as shown in FIG. 4. In either embodiment, one or more host-fabric adapters 120 may be provided to interface the local system 20 to the multi-stage switched fabric 100'.

FIGS. 3-4 merely illustrate example embodiments of a local system 20. A wide array of processor configurations of such a local system 20 may be available. A software driver stack for the host-fabric adapter 120 may also be provided to allow the local system 20 to exchange data with one or more remote systems 150, 170 and 30 via the switched fabric 100', while preferably being compatible with many currently available operating systems, such as Windows 2000.

Figure 5:
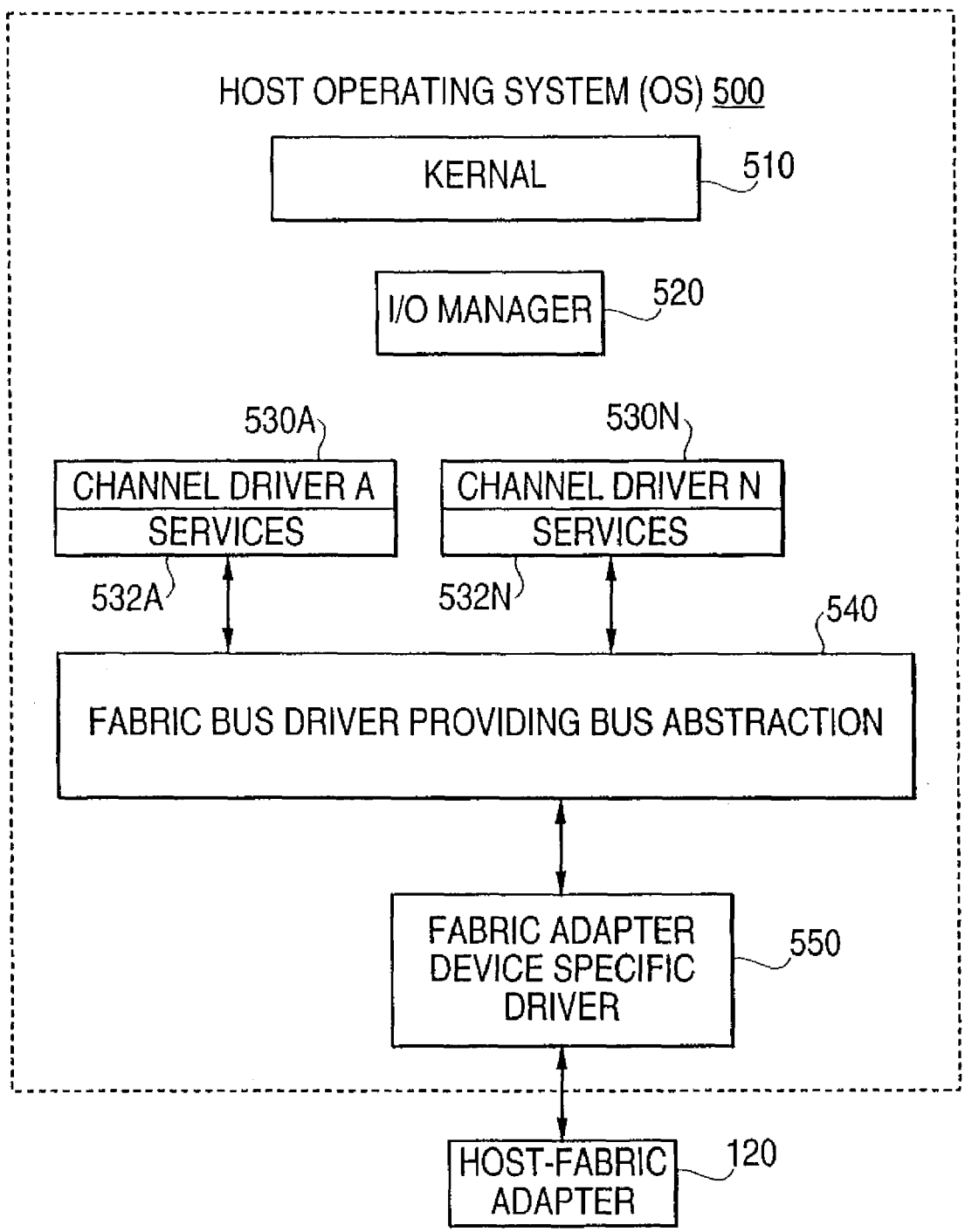
FIG. 5 illustrates an example software driver stack of a host operating system of an example data network according to an example embodiment of the present invention.

FIG. 5 illustrates an example software driver stack of a host system 20. As shown in FIG. 5, a host operating system (OS) 500 may include a kernel 510, an I/O manager 520, and a plurality of channel drivers 530A-530N for providing an interface to various I/O controllers. Such a host operating system (OS) 500 may be Windows 2000, for example, and the I/O manager 520 may be a Plug-n-Play manager.

In addition, a host-fabric adapter software stack (driver module) may be provided to access the switched fabric 100' and information about fabric configuration, fabric topology and connection information. Such a host-fabric adapter software stack (driver module) may include a fabric bus driver 540 and a fabric adapter device-specific driver 550 utilized to establish communication with a remote fabric-attached agent (e.g., I/O controller), and perform functions common to most drivers, including, for example, host-fabric adapter initialization and configuration, channel configuration, channel abstraction, resource management, fabric management service and operations, send/receive I/O transaction messages, remote direct memory access (RDMA) transactions (e.g., read and write operations), queue management, memory registration, descriptor management, message flow control, and transient error handling and recovery. Such software driver module may be written using high-level programming languages such as C, C++ and Visual Basic, and may be provided on a computer tangible medium, such as memory devices; magnetic disks (fixed, floppy, and removable); other magnetic media such as magnetic tapes; optical media such as CD-ROM disks, or via Internet downloads, which may be available for a fabric administrator to conveniently plug-in or download into an existing operating system (OS). Such a software driver module may also be bundled with the existing operating system (OS) which may be activated by a particular device driver.

The host-fabric adapter driver module may consist of three functional layers: a HCA services layer (HSL), a HCA abstraction layer (HCAAL), and a HCA device-specific driver (HDSD) in compliance with the "*Next Generation I/O Architecture: Host Channel Adapter Software Specification.*" For example, the HCA service layer (HSL) may be inherent to all channel drivers 530A-530N for providing a set of common fabric services in a service library, including connection services, resource services, and HCA services required by the channel drivers 530A-530N to instantiate and use NGIO channels for performing data transfers over the NGIO channels. The fabric bus driver 540 may correspond to the HCA abstraction layer (HCAAL) for managing all of the device-specific drivers, controlling shared resources common to all HCAs in a host and resources specific to each HCA in the local system 20, distributing event information to the HSL and controlling access to specific device functions. Likewise, the device-specific driver 550 may correspond to the HCA device-specific driver for providing an abstract interface to all of the initialization, configuration and control interfaces of an HCA.

The local system 20 may also communicate with one or more remote systems 150, 170 and 30, including I/O units and I/O controllers (and attached I/O devices) which are directly attached to the switched fabric 100' (i.e., the fabric-attached I/O controllers) using a Virtual Interface (VI) architecture in compliance with the "*Virtual Interface (VI) Architecture Specification, Version 1.0*," as set forth by Compaq Corp., Intel Corp., and Microsoft Corp., on Dec. 16, 1997. NGIO and VI architectures support asynchronous data transfers between two memory regions, typically on different systems over one or more designated channels of a data network. Each system using a VI architecture may contain work queues formed in pairs including a send queue and a receive queue in which requests, in the form of descriptors, are posted to describe data movement operation and location of data to be moved for processing and/or transportation via a NGIO switched fabric. The VI Specification defines VI mechanisms for low-latency, high-bandwidth message-passing between interconnected nodes connected by multiple logical point-to-point channels. Other architectures such as Infiniband may also be used to implement the present invention.

In such data networks, NGIO, VI and Infiniband hardware and software may be used to support asynchronous data transfers between two memory regions, often on different systems. Each system may serve as a source (initiator) system which initiates a message data transfer (message send operation) or a target system of a message passing operation (message receive operation). Each system may correspond to a multi-processor system including multiple processors each capable of processing an I/O completion on a different shared resource (such as work queues or other memory elements associated with a given hardware adapter). Examples of such a multi-processor system may include host servers providing a variety of applications or services, and I/O units providing storage oriented and network oriented I/O services.

RDMA operations allow data transfers between memory regions on different systems. The RDMA requests are formatted into RDMA elements and invoke an appropriate data transfer service. An RDMA element may define the size of RDMA data buffers and their location in memory. The RDMA elements may also reference multiple local data buffers, but are generally limited to a single remote data buffer.

Figure 6:
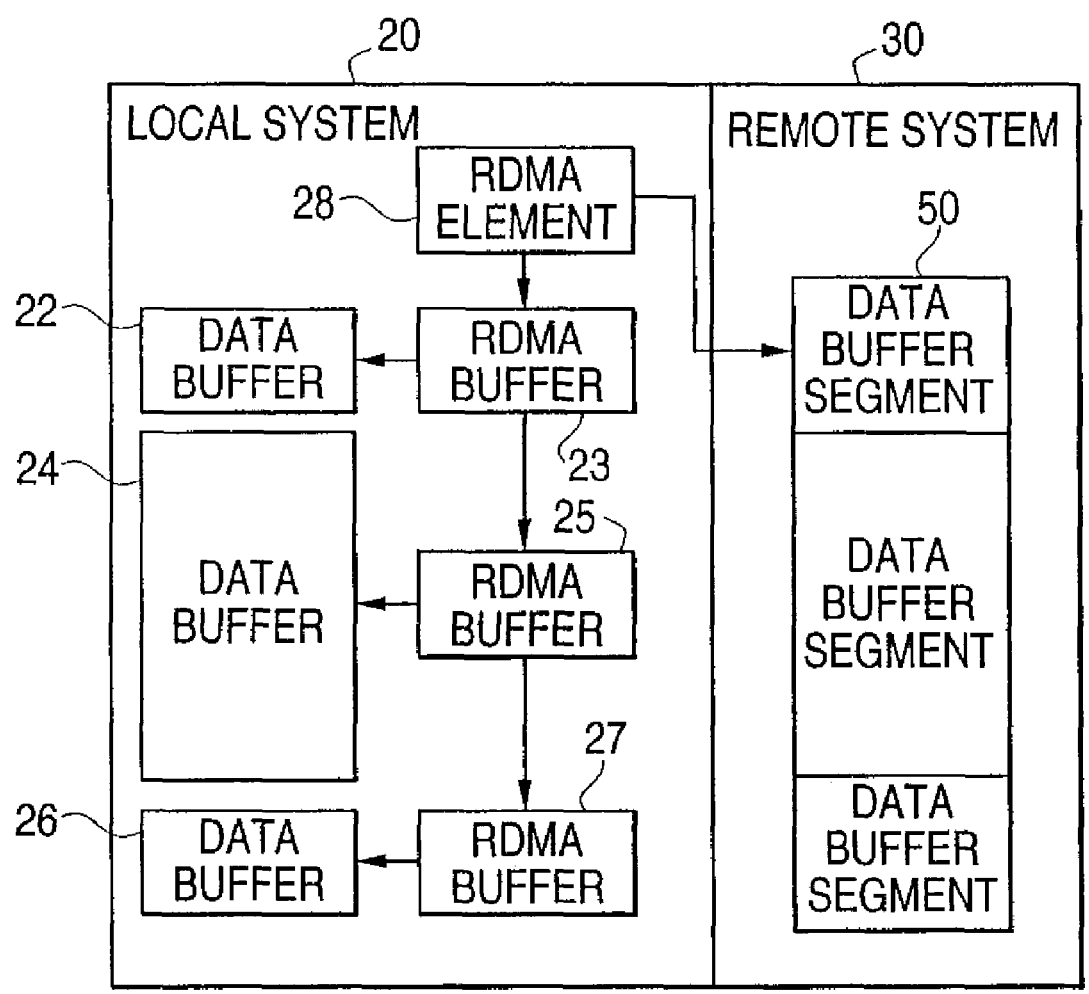
FIG. 6 shows a RDMA data transfer request structure according to an example embodiment of the present invention.

FIG. 6 shows one example embodiment of how data may be transferred between a local system 20 and a remote system 30. For ease of illustration, FIG. 6 does not show the interconnection fabric 100 between the local system 20 and the remote system 30. The local system 20 may include data buffers 22, 24 and 26 that can be of varying sizes or can be of equal sizes. The data buffers 22, 24 and 26 may be separate or contiguous data buffers. The data buffers 22, 24 and 26 may be provided within the main memory 206 or they may be provided virtually anywhere within the local system 20. An RDMA element 28 may be provided from a user and reference local RDMA buffers 23, 25 and 27, which in turn correspond to the data buffers 22, 24 and 26, respectively. The RDMA element 28 is also associated with the data buffer segment 50 provided within the remote system 30. As discussed above, hardware or application software may restrict the maximum size of data (hereafter also referred to as maximum transfer size or capacity) that may be supported for a single data transfer between the local system 20 and the remote system 30. That is, the architecture may only be able to support a 4 gigabyte data transfer although the amount of data desired to be transferred may exceed 4 gigabytes.

The present invention may coalesce (or merge) small RDMA requests into a single transfer operation so as to increase the system performance. The present invention may also divide large RDMA requests into multiple operations to support hardware and software limitations. A combined RDMA request optimizes system usage by providing a single function call in place of multiple calls and allows the underlying hardware and software to perform the transfer more efficiently. That is, as each call requires a predetermined amount of set-up time as well as other overhead, excessive/redundant set-up times and overhead can be minimized by minimizing the number of calls made.

Figure 7:
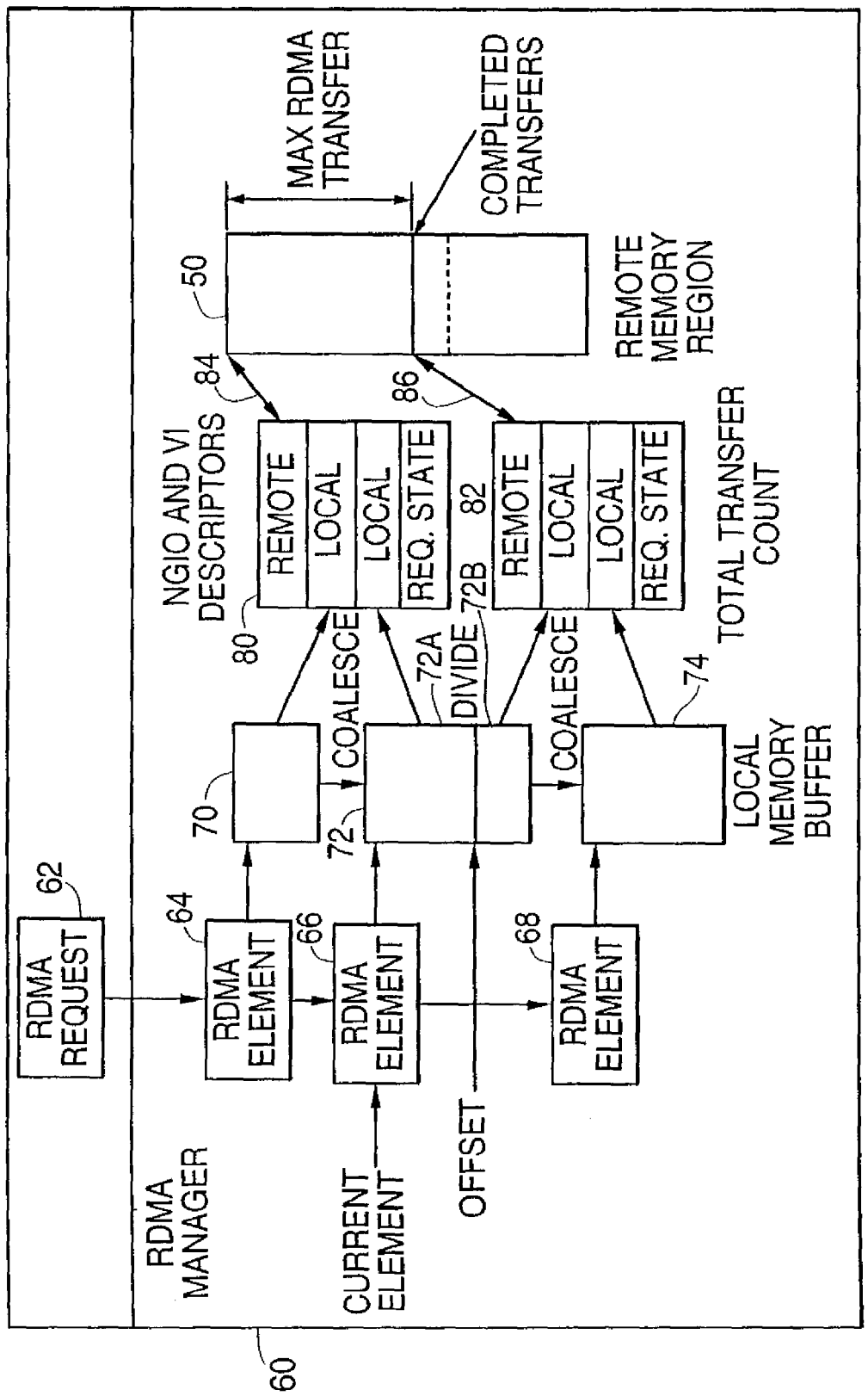
FIG. 7 shows RDMA coalescing and dividing and data transfer from the local memory to the remote memory according to an example embodiment of the present invention.

More specifically, FIG. 7 shows an exemplary embodiment of how data may be coalesced or divided in accordance with the present invention. The operations may take place within an RDMA manager 60 of the local system 20. The RDMA manager 60 may be provided within the host-fabric adapter software stack although the RDMA manager 60 may be provided virtually anywhere within the local system 20 provided it may communicate with the buffer regions. The present invention may be performed by software that organizes and appropriately transfers that data between the local system 20 and the remote system 30. The software to perform this method may be provided on any number of tangible storage mediums, including but not limited to, CD-ROM, diskettes, tapes, etc. The software may also be downloaded from another computer network, downloaded from the Internet or World Wide Web transferred by a wireless communication network, or any other viable method.

As shown in FIG. 7, an RDMA request 62 is initially provided. The RDMA request 62 may be formatted into RDMA elements 64, 66 and 68 which in turn correspond to data within the local memory buffers 70, 72 and 74. The local memory buffers 70, 72 and 74 may correspond with the data buffers 22, 24 and 26 shown in FIG. 6. Each RDMA request 62 may be associated with a REQUEST STATE register or flag that indicates the state of the current request (i.e, whether it has been fulfilled or not).

The network architecture may use descriptors to notify the respective hardware of the data transfer requests. The descriptors specify the remote memory buffer or region 50 (i.e., REMOTE) within the remote system 30 to which the data will be transferred. One data segment may be provided for each local memory buffer (i.e., LOCAL). For the example shown in FIG. 7, the RDMA element 64 is associated with the local memory buffer 70, the RDMA element 66 is associated with the local memory buffer 72, and the RDMA element 68 is associated with the local memory buffer 74. The RDMA manager 60 associates each of the local memory buffers 70, 72 and 74 with a descriptor. Each descriptor in turn is associated with a different data transfer operation from the local system 20 to the remote system 30. In this example, the RDMA manager 60 associates the data within the local memory buffer 70 with the first descriptor 80 which in turn corresponds with the first transfer operation 84. The example local memory buffer 70 includes less data than that which is capable of being transferred to the remote system 30 in a single transfer operation. In other words, the amount of data is less than the maximum transfer capacity (i.e., max RDMA transfer size) of the system. The RDMA manager 60 then determines whether any additional data beyond that which in the local memory buffer 70 can be transferred in the first transfer operation 84. This decision may be based on the maximum transfer capacity of the system and the amount of data already allocated to that data transfer operation. In this example, because additional data can be transferred, the RDMA manager 60 associates a portion 72A of the local memory buffer 72 with the first transfer operation 84. The portion 72A corresponds to an amount of data that when added with the amount of data in the local memory buffer 70, does not exceed the maximum transfer capacity of the system. The first descriptor 80 is thus associated with data from the local memory buffer 70 and a portion 72A of the local memory buffer 72. As discussed above, the amount of data that may be transferred in the first transfer operation 84 depends on the maximum transfer capacity of the architecture including the transfer capacity of the local system, the remote system and the supporting architecture of the network, such as the NGIO, the VI and/or the Infiniband architecture.

Because RDMA operations generally register the descriptors with the hardware, a limited number of descriptors may be available to the system. A large RDMA request may require more than one descriptor. In order to support RDMA operations that require more descriptors than are available, the present invention may maintain the current state of a request (i.e., REQUEST STATE) in the RDMA manager 60. REQUEST STATE is maintained to allow the system to divide a single RDMA request into multiple descriptors and allow continuation of RDMA requests when additional resources become available. As discussed above, the present invention may format the descriptors to transfer up to the maximum RDMA transfer size and update the REQUEST STATE to indicate the portion of data remaining to be transferred.

The RDMA manager 60 may maintain a pointer at the respective RDMA elements and/or buffer to indicate what data is associated with which descriptor. In the above-described example, the first descriptor 80 is associated with data within the local buffer 70 and the portion 72A of data within the local memory buffer 72. In order to determine what data (i.e., which buffer) has been associated with a descriptor and what data has not been associated with a descriptor, the RDMA manager 60 maintains a pointer (or counter) CURRENT ELEMENT that references the appropriate RDMA element (and/or buffer) indicating which data has been associated with a descriptor and which data has not been associated with a descriptor. A pointer (or counter) OFFSET may identify a location within the local memory buffer indicating which data in the buffer has been associated with a descriptor and which data has not been associated with a descriptor. Stated differently, the pointer (or counter) CURRENT ELEMENT and OFFSET are used to identify data within the local memory buffers 70, 72 and 74.

In the FIG. 7 example, the pointer OFFSET is used to distinguish the portion 72A associated with the first descriptor 80 and the portion 72B that has not yet been associated with a descriptor. After determining that the amount of data for the first transfer operation 84 is as much as the system will allow (or desire), the portion 72B of data within the local memory buffer 72 is associated with a second descriptor 82. The second descriptor 82 corresponds to a second transfer operation 86 from the local system 20 to the remote system 30. The amount of data within the portion 72B is less than the maximum transfer capacity of the system. Therefore, the RDMA manager 60 determines whether any more data can be associated with the second transfer operation 86. Again, this may be accomplished by referencing the maximum transfer capacity of the system. In this example, all the data within the local memory buffer 74 can also be transferred in the second transfer operation 86 because the combination of data within the portion 72B and the data within the local memory buffer 74 is less than the maximum transfer capacity of the system. Accordingly, the portion 72B and the buffer 74 are associated with the second descriptor 82 and the second transfer operation.

The present invention may associate data within the local buffers with each of the descriptors 80 and 82 prior to any transfer operation occurring. In this situation, the RDMA manager 60 may obtain a total transfer count indicating a number of transfers that will be necessary to satisfy the RDMA request 62. The RDMA data manager 60 may also determine the first descriptor 80, perform a first data transfer operation 84, then determine a second descriptor 82 and subsequently perform a second data transfer operation 86. In other words, the present invention may determine the second descriptor 82 (or any subsequent descriptors) prior to, during, or subsequent to the first data transfer operation 84.

If multiple RDMA elements reference different local memory buffers but are destined for contiguous, remote memory regions, the data transfers may be combined (i.e. coalesce) into as few transfers as possible. However, if a coalesced or single request is larger than the maximum RDMA transfer size or requires more data segments than those allocated for a descriptor, then the request may be divided among multiple descriptors. This allows optimal usage of hardware and descriptor resources.

The above-described example embodiments have been described with respect to transferring data to a remote memory. The present invention is also applicable to transferring data from a remote system 30 and into a local system 20. In this type of operation, the descriptors 80 and 82 may be formatted such that they provide the data from the remote memory 50 into the local memories 70, 72 or 74. Using the example embodiment of FIG. 7, the RDMA manager 60 desires to fill the local buffers 70, 72 and 74 with data from the remote memory 50. The RDMA manager 60 formats the descriptor 80 such that the local memory 70 and portion 72A of local memory 72 are associated with the first transfer operation 84 from the remote memory 50 to the local system 20. This is accomplished by knowing the maximum transfer capacity of the system and by knowing the capacity of each of the local memories 70, 72 and 74. The RDMA manager 60 likewise associates portion 72B of local memory 72 and local memory 74 with the second descriptor 82 and the second transfer operation 86 because this amount of data does not exceed the maximum transfer capacity of the system. In similar manner as described above, the RDMA manager 60 may utilize the descriptors 80 and 82 by using one pointer CURRENT ELEMENT and OFFSET to properly reference the local memory buffers that the data should be placed in after being transferred from the remote memory buffer 50.

Figure 8:
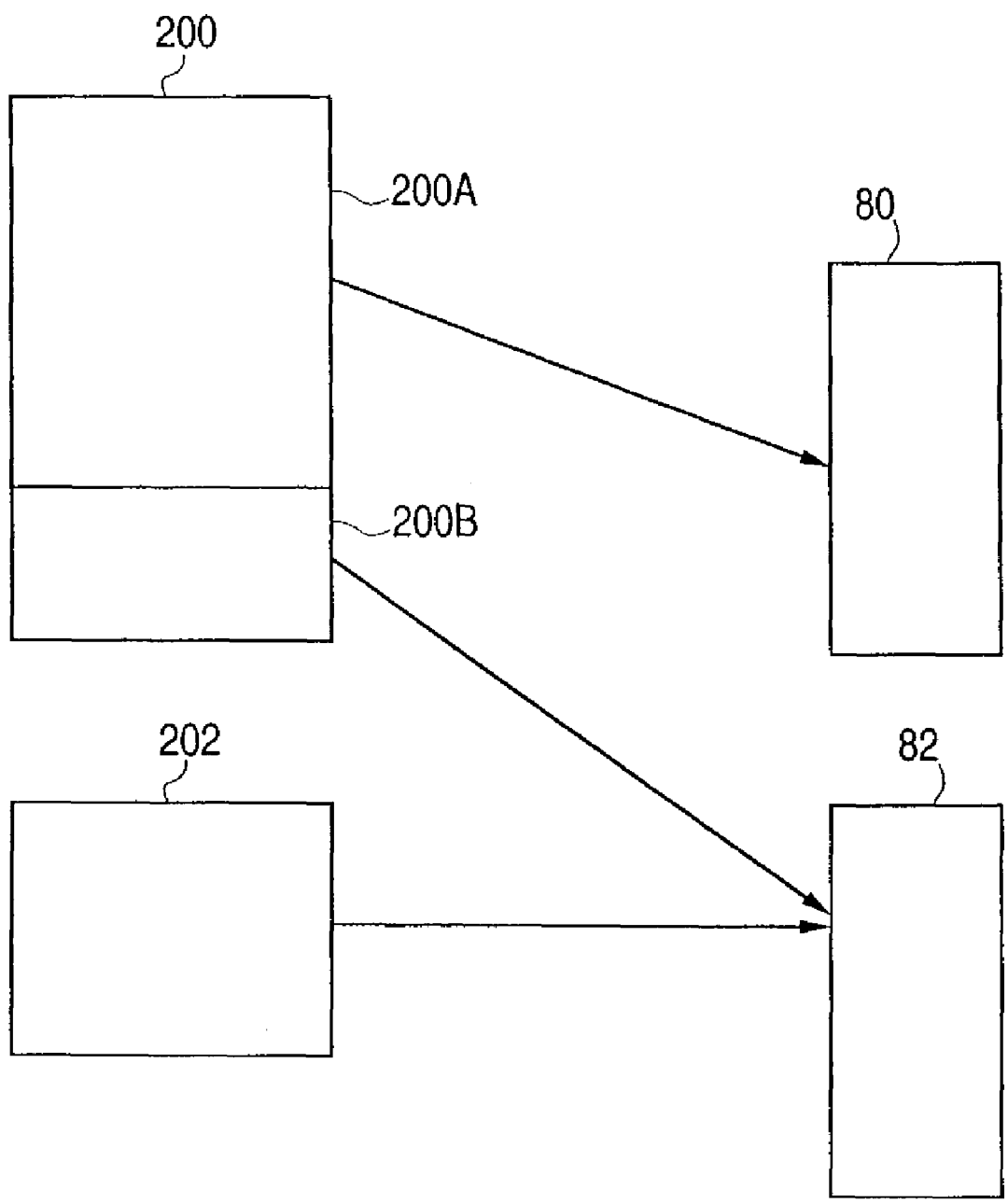
FIG. 8 shows RDMA coalescing and dividing according to an example embodiment of the present invention.

FIG. 8 shows another example embodiment of how data within local memory buffers 200 and 202 may be divided and coalesced into two descriptors 80 and 82 for two independent data transfer operations. Local memory buffers 200 and 202 may be similar to the local memory buffers 70, 72 and 74 of FIG. 7. In this example, the amount of data within local memory buffer 200 exceeds the maximum data transfer capacity of the system so the RDMA manager 60 divides the data into a first portion 200A and a second portion 200B. The first portion 200A is associated with the first descriptor 80 and the first transfer operation 84. The first portion 200A does not exceed the maximum transfer capacity of the system. The second portion 200B is associated with the second descriptor 82 and the second transfer operation 86. In this example, the data within the local memory buffer 202 may be coalesced (or combined) with the portion 200B provided the total amount of data is less than the maximum transfer size. Hence, the data within local memory buffer 202 is associated with descriptor 82 and the second transfer operation 86.

Figure 9:
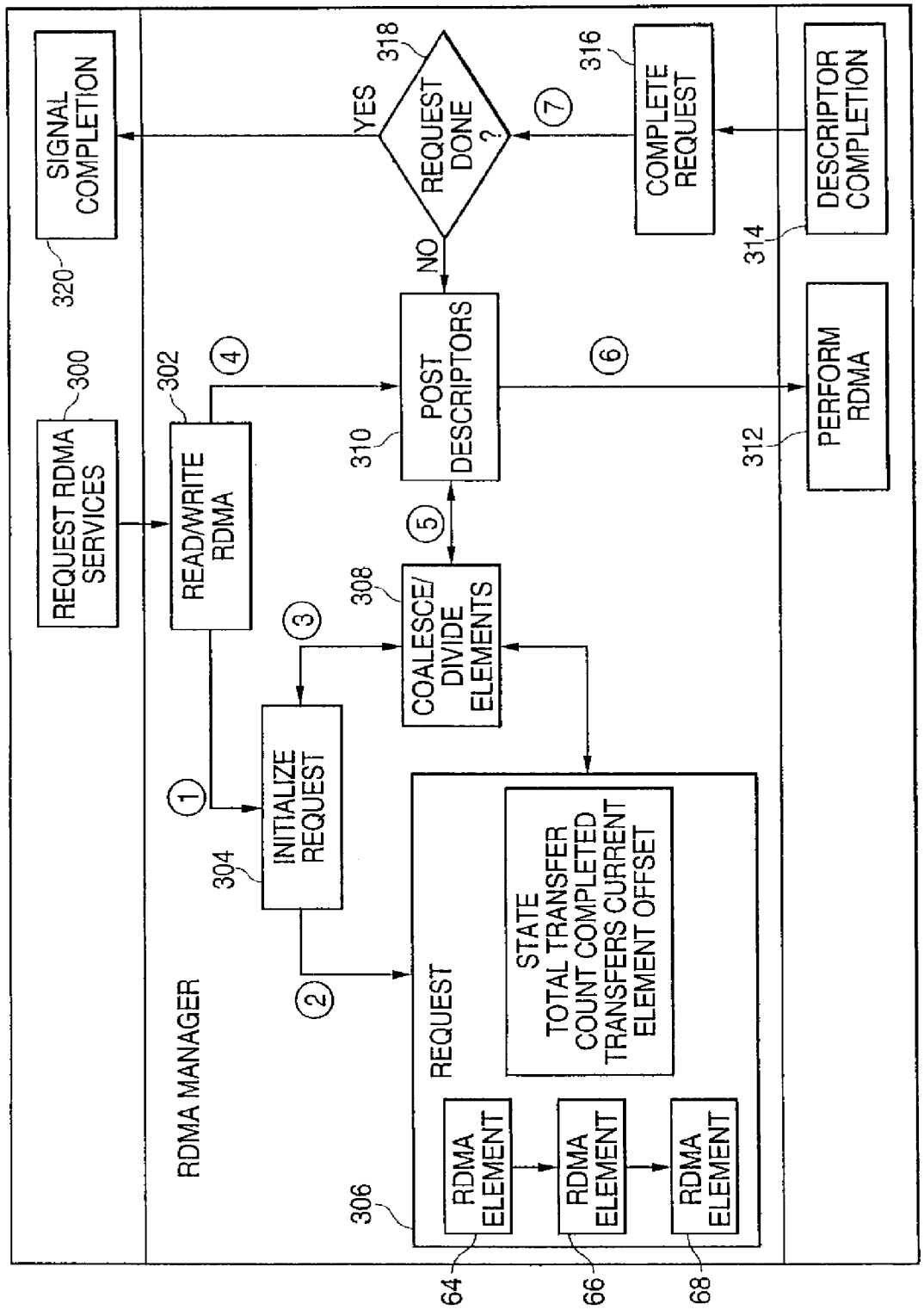
FIG. 9 shows a RDMA request control overflow overview according to an example embodiment of the present invention.

FIG. 9 shows a brief overview of an example algorithm used by the present invention. This algorithm may be performed by the software of the networked system and is merely illustrative of the present invention. That is, other algorithms of performing the invention are also within the scope of the present invention.

FIG. 9 shows that an initial request for RDMA services is made (block 300). This request may be either a read or write operation (block 302). The request is initialized in block 304. Then, in block 306, the chain of RDMA elements is determined. The system then performs the coalescing and dividing algorithm as discussed above (block 308). Blocks 304, 306 and 308 are repeatedly performed to count the total transfer count or the number of transfers needed to complete the RDMA request. Each transfer operation may require one descriptor as discussed above. The formation of RDMA elements 64, 66 and 68 may be achieved in block 306. Using the algorithm, the respective local memory buffers 70, 72 and 74 may be coalesced and/or divided in block 308 so as to determine the total transfer count and to determine the descriptors. This may involve counting the number of completed transfers as well as using the pointers CURRENT ELEMENT and OFFSET as discussed above.

In block 310, the first descriptor 80 and the second descriptor 82 may be posted. The formatted descriptors may then be placed in the work queue and the RDMA data transfer may be performed in block 312. After the data transfer for the first descriptor 80, the system may update the number of completed transfers in block 314 and check whether the RDMA request is complete in block 318. If additional data transfers are needed (i.e., the system has not performed the total transfer count) then block 310 may post the next descriptor, such as the second descriptor 82, and perform the appropriate RDMA data transfer in block 312. Blocks 314, 316 and 318 are likewise performed again. Upon completion of this loop, a signal may be output in block 320 to signal that all of the data of the initial request has been transferred.

The following algorithm may be used to format a single descriptor and includes the coalescing and dividing operation. This algorithm corresponds to the coalesce/divide elements routine 308 shown in FIG. 9 and its relation with block 306. This algorithm is merely illustrative and is not meant to be limiting of the invention. That is, other algorithms are also within the scope of this invention.

```
Format Descriptor ( Request, Descriptor )
{
    Initialize the descriptor
    Current Transfer Size = 0
    Current Element = Request State Current Element
    // Walk the chain of RDMA elements in an attempt to coalesce the elements.
    for each data segment allocated in the Descriptor
    {
        // Determine how much data still needs to be transferred for the
        // current RDMA element.
        Element Size Remaining = Current Element Byte Count - Request State Offset
        // Determine how much can be transferred by the current descriptor.
        Transfer Size Remaining = Max RDMA Transfer - Current Transfer Size
        // Set the starting address for this data segment of the transfer.
        Descriptor Data Segment Local Address =
            Current Element Local Address + Request State Offset
        // See if we need to divide the RDMA element into multiple requests.
        if ( Element Size Remaining > Transfer Size Remaining )
        {
            // We will need another descriptor to complete this RDMA element.
            // Place what we can in this descriptor.
            Descriptor Data Segment Length = Transfer Size Remaining
            // Update the state of the request and return.
            Request State Offset = Request State Offset + Transfer Size Remaining
            exit for loop
        }
        // Add the rest of the RDMA element to the descriptor.
        Descriptor Data Segment Length = Element Size Remaining
        Current Transfer Size = Current Transfer Size + Element Size Remaining
        if there is not another RDMA element
        {
            // Update the Request State to signal that we are done. The completion
            // routine will check this to see if more descriptors need to be posted.
            Request State Current Element = NULL
            exit for loop
        }
        Update the Request State to reference the next element
        Request State Offset = 0
        // See if we can coalesce the next RDMA element.
        if we cannot coalesce the next element
        {
            exit for loop
        }
    }
    Complete formatting the descriptor
}
```

The following algorithm provides one example of how to coalesce/divide the data within the local memory buffers into different data transfer operations. This algorithm is merely illustrative and is not meant to be limiting of the invention. That is, other algorithms are also within the scope of this invention.

```
boolean FormatRdmaRequest( )
{
    // Walk the buffers in an attempt to chain together smaller
    requests. while we still have buffers and the total transfer length
    does not exceed the maximum                supported
    {
        Determine how much data still needs to be transferred for
            the current buffer and how much can be transferred by
            the current request.
        Add the buffer to the descriptor.
        // See if we need to split the RDMA object into multiple
        requests. if the current buffer is too large to transfer in
            its entirety
        {
            Place what we can in this descriptor.
            Update the size of the request.
            Save the offsets.
            exit the while loop
        }
        Add the rest of the buffer to the descriptor.
        Get a reference to the next buffer in the chain.
        Reset the current offset since we are starting a new
            buffer.
    }
    Set total size of transfer and save the state of the transfer
    Return TRUE if the transfer is complete }
```

The present invention may provide unique advantages based on its RDMA coalescing and dividing algorithm. The present invention may abstract the details of NGIO, VI and Infiniband descriptors away from developers to thereby decrease the application and driver development time. The present invention may also optimize the usage of hardware by coalescing multiple RDMA requests into a single data transfer. The present invention may further provide a mechanism to support RDMA transfers larger than those supported by the underlying hardware implementations. The present invention may provide an algorithm to coalesce and divide RDMA requests over NGIO, VI and Infiniband architectures. The present invention may also maintain and check the state of RDMA requests, allowing for better system resource allocation and usage by permitting descriptor reuse.

Several example embodiments of the present invention are specifically illustrated and/or described herein. However, it will be appreciated that modifications and variations of the present invention are covered by the above teaching and are within the preview of the appended claims without departing from the spirit and intended scope of the invention. For example, while the present invention has been described with reference to NGIO, VI and Infiniband architecture, the various aspects of the present invention are applicable to other types of networks that include data transfers between a local computer system and a remote computer system.

What is claimed is:

1. A method comprising:
   if an amount of data located in one or more local memory buffers in a local computer system associated with one or more remote direct memory access (RDMA) requests does not exceed a maximum transfer size for a single memory to memory transfer operation over a data network to one or more remote memory buffers in a remote computer system:
   associating the data located in the one or more local memory buffers with a first transfer operation over the data network to the one or more remote memory buffers in the remote computer system; and
   if an amount of data associated with the first transfer operation has not reached the maximum transfer size:

associating at least a portion of data, otherwise to be associated with a subsequent transfer operation associated with the one or more RDMA requests, with the first transfer operation instead of with the subsequent transfer operation, the portion of the data being located in one or more other memory buffers in the local computer system, the subsequent transfer operation to be over the data network to the remote memory buffer in the remote computer system, the one or more local memory buffers being separated from the one or more other memory buffers, the one or more local memory buffers and the one or more other memory buffers being of varying sizes in a main memory in the local computer system, the maximum transfer size being restricted by hardware in the local computer system, an RDMA element in the local computer system referencing local computer system buffers that correspond to the one or more local memory buffers and the one or more other memory buffers, and the RDMA element also being associated with the remote memory buffer.

2. The method of claim 1, wherein:
if the amount of data located in the one or more local memory buffers exceeds the maximum transfer size:
associating part of the data located in the one or more local memory buffers with the first transfer operation; and
associating one or more other portions of the data located in the one or more local memory buffers with one or more subsequent transfer operations.

3. The method of claim 1, additionally comprising transferring the data associated with the first transfer operation.

4. The method of claim 1, additionally comprising associating a descriptor with the first transfer operation, the descriptor to specify the one or more remote memory buffers and the one or more local memory buffers.

5. The method of claim 4, additionally comprising:
associating another descriptor with each of the one or more subsequent transfer operations; and
transferring the data associated with the one or more subsequent transfer operations.

6. An apparatus comprising:
an RDMA (remote direct memory access) manager operable to:
if an amount of data located in one or more local memory buffers in a local computer system associated with one or more RDMA requests does not exceed a maximum transfer size for a single memory to memory transfer operation over a data network to one or more remote memory buffers in a remote computer system:
associate the data located in the one or more local memory buffers with a first transfer operation over the data network to the one or more remote memory buffers in the remote computer system; and
if an amount of data associated with the first transfer operation has not reached the maximum transfer size:
associate at least a portion of data, otherwise to be associated with a subsequent transfer operation associated with the one or more RDMA requests, with the first transfer operation instead of with the subsequent transfer operation, the portion of the data being located in one or more other memory buffers in the local computer system, the subsequent transfer operation to be over the data network to the remote memory buffer in the remote computer system, the one or more local memory buffers being separated from the one or more other memory buffers, the one or more local memory buffers and the one or more other memory buffers being of varying sizes in a main memory in the local computer system, the maximum transfer size being restricted by hardware in the local computer system, an RDMA element in the local computer system referencing local computer system buffers that correspond to the one or more local memory buffers and the one or more other memory buffers, and the RDMA element also being associated with the remote memory buffer.

7. The apparatus of claim 6, wherein:
if the amount of data located in the one or more local memory buffers exceeds the maximum transfer size:
associating part of the data located in the one or more local memory buffers with the first transfer operation; and
associating one or more other portions of the data located in the one or more local memory buffers with one or more subsequent transfer operations.

8. The apparatus of claim 6, additionally comprising transferring the data associated with the first transfer operation.

9. The apparatus of claim 6, additionally comprising associating a descriptor with the first transfer operation, the descriptor to specify the one or more remote memory buffers and the one or more local memory buffers.

10. The apparatus of claim 9, additionally comprising:
associating another descriptor with each of the one or more subsequent transfer operations; and
transferring the data associated with the one or more subsequent transfer operations.

11. Computer-readable storage memory device including program instructions to be executed by a computer processor for performing the following:
if an amount of data located in one or more local memory buffers in a local computer system associated with one or more remote direct memory access (RDMA) requests does not exceed a maximum transfer size for a single memory to memory transfer operation over a data network to one or more remote memory buffers in a remote computer system:
associating the data located in the one or more local memory buffers with a first transfer operation over the data network to the one or more remote memory buffers in the remote computer system; and
if an amount of data associated with the first transfer operation has not reached the maximum transfer size:
associating at least a portion of data, otherwise to be associated with a subsequent transfer operation associated with the one or more RDMA requests, with the first transfer operation instead of with the subsequent transfer operation, the portion of the data being located in one or more other memory buffers in the local computer system, the subsequent transfer operation to be over the data network to the remote memory buffer in the remote computer system, the one or more local memory buffers being separated from the one or more other memory buffers, the one or more local memory buffers and the one or more other memory buffers being of varying sizes in a main memory in the local computer system, the maximum transfer size being restricted by hardware in the local computer system, an RDMA element in the local computer system referencing local computer system buffers that correspond to the one or more local memory buffers and the one or more other memory buffers, and the RDMA element also being associated with the remote memory buffer.

12. The computer-readable storage memory device of claim 11, wherein:

if the amount of data located in the one or more local memory buffers exceeds the maximum transfer size:

associating part of the data located in the one or more local memory buffers with the first transfer operation; and associating one or more other portions of the data located in the one or more local memory buffers with one or more subsequent transfer operations.

13. The computer-readable storage memory device of claim 11, additionally comprising transferring the data associated with the first transfer operation.

14. The computer-readable storage memory device of claim 11, additionally comprising associating a descriptor with the first transfer operation, the descriptor to specify the one or more remote memory buffers and the one or more local memory buffers.

15. The computer-readable storage memory device of claim 14, additionally comprising:

associating another descriptor with each of the one or more subsequent transfer operations; and transferring the data associated with the one or more subsequent transfer operations.

* * * * *